Patented Aug. 3, 1948

UNITED STATES PATENT OFFICE 2,446,504

CARBOXYLATED MONOSUBSTITUTED BARBITURIC ACID

Wilhelm Wenner, Montclair, N. J., assignor to Hoffmann-La Roche Inc., Nutley, N. J., a corporation of New Jersey No Drawing. Application January 18, 1946, Serial No. 642,110

18 Claims. (Cl. 260—257)

My invention relates to carboxylated monosubstituted barbituric acids useful as intermediates for medicinal agents and to the process of manufacture of these novel compounds.

My new compounds may be in general represented as:

(I)
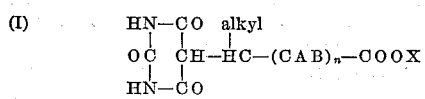

and (II)
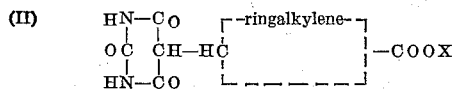

in which $n$ is zero or an integer, and in which A, B, and X represent hydrogen or alkyl.

For the purpose of simplifying the understanding of the subject matter, the designation "Barb" will be employed hereinafter to represent the monovalent barbituric acid residue:

(III)

I have found that these new derivatives can be obtained in satisfactory yields by the catalytic hydrogenation of barbituric acid in the presence of at least one stoichiometric molecular equivalent of a keto-acid ester of the general formulae:

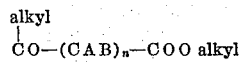

and

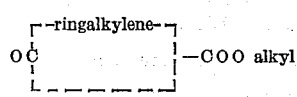

The general scheme of the new reaction typified by the following equation, in which A and B are hydrogen is that in which ethyl acetoacetate and barbituric acid are hydrogenated:

(IV)
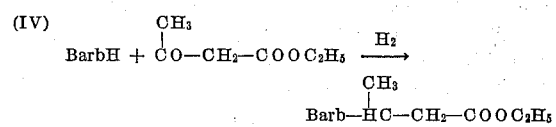

As a result of this reaction, a final product is obtained (IV) which is 5-(β-carbethoxy-α-methyl-ethyl)-barbituric acid. This ester is easily soluble in ethanol or methanol. It can be recrystallized from water. Crystallization proceeds slowly. The pure compound has a melting point of 163–164°. The ester can be saponified by alkalies, yielding the corresponding salt, which upon acidification, produces the free acid represented by the formula:

(V)
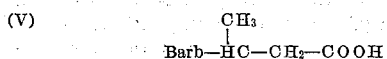

The reaction with methyl acetoacetate yields the corresponding methyl ester of melting point of 164–165° which closely resembles the ethyl ester in its chemical behavior and has nearly the same melting point. Upon saponification, it gives the same acid (V) as is obtained from the ethyl ester (IV). The methyl ester is less soluble, however, than the ethyl ester.

I have found that my novel compounds can be prepared from a variety of keto-acid esters. Examples of suitable esters which may be employed will be shown hereinafter. It will be apparent from the general Formulae I and II, given above, that the keto-acid esters may be substituted, that is A and/or B may be alkyl. For example, a mono-substituted ester may be used, such as, the compound represented by the formula:

(VI)
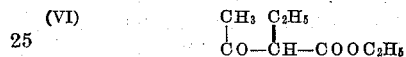

A dialkyl substituted ester may also be employed, as for example ethyl dimethyl acetoacetate.

An example of a starting ester in which $n$ is zero is ethyl pyruvate.

Cycloalkyl keto-esters, such as ethyl-cyclopentanon-2-carboxylate, of Formula VII, may be employed:

(VII)
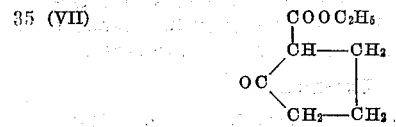

Similarly, the cyclohexanon ester of Formula VIII may be used:

(VIII)
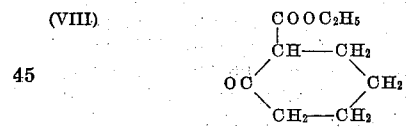

Upon hydrogenation with barbituric acid, these two cyclic esters yield, respectively, 5-(o-carbethoxy-cyclopentyl)-barbituric acid (IX), and 5-(o-carbethoxy-cyclohexyl)-barbituric acid (X):

(IX) 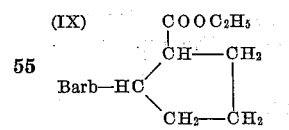 (X) 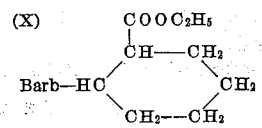

GENERAL PROCEDURE

In general, the reaction may be carried out as follows:

Barbituric acid, the particular keto-acid ester, and a solvent such as an alcohol, for example methanol or ethanol, are placed in a hydrogenation autoclave. A noble metal catalyst, such as palladium charcoal is also employed. The palladium content of the charcoal can vary within wide limits, 3%, in most instances, being as suitable as 20%. It may be desirable to promote the reaction by the use of ammonium acetate. The pressure may be as low as 100 lbs., but I prefer to use at least 500 lbs. The temperature does not appear to be critical as long as it does not produce decomposition. The reaction is preferably carried out with a slight excess of keto-acid ester. The amount of solvent can be relatively small, for example of the order of about 30–80 cc. of alcohol for 10–20 g. of barbituric acid.

The isolation of the product depends upon the nature thereof. Where the new compound is crystallized, it is best filtered together with the catalyst, followed by removal of the catalyst in a recrystallization process. The mother liquor may contain additional amounts of the product which may be recovered by distillation of the solvent. In those cases where the product is not found crystallized after the reaction, the solutions are filtered from the catalyst; the filtrates are evaporated, and the residue crystallizes in most cases. Where the product is obtained first as an oil, it solidifies upon the addition of water, and recrystallization from water yields a pure compound.

The new compounds are rather soluble in lower aliphatic alcohols, and less so in water. They can, for the most part, be recrystallized from boiling water. Most of the new products possess the characteristic odor of barbituric acids, although not very distinctly. The compounds are practically insoluble in benzene, or in petroleum ether. The compounds are soluble in alkali. The free acids yield alkali salts which are highly soluble in water.

The following examples are presented to illustrate various embodiments of my invention, however, it will be understood that the examples are intended to be typical of the broad reactions, and that the particular reagents employed, as well as the conditions under which the reactions are carried out, are not to be taken as restrictive in nature. The products may be prepared and used in either a pure or an impure state.

EXAMPLE 1

5-($\beta$-carbomethoxy-$\alpha$-methyl-ethyl)-barbituric acid 200 g. of technical barbituric acid, 220 g. of methyl acetoacetate, 10 g. of palladium charcoal, containing 1 g. of palladium, and 400 cc. of methanol are hydrogenated at 86–90° and 600 lbs. pressure for 20 hours. Most of the reaction product crystallizes. 2500 cc. of methanol are added and the mixture refluxed. The crystals dissolve and the hot solution is filtered from the catalyst. The filtrate is cooled for several hours to 0°. The main amount of the compound crystallizes and is filtered. The mother liquor is concentrated to a small volume giving a second crop. Recrystallization from methanol gives the pure compound of M. P. 163–164°.

EXAMPLE 2

5-($\beta$-carbethoxy-$\alpha$-methyl-ethyl)-barbituric acid 200 g. of barbituric acid, 215 g. of ethyl acetoacetate, 10 g. of palladium charcoal containing 1 g. of palladium, and 420 cc. of methanol are hydrogenated at 90–100° and 700 lbs. pressure for 18 hours. Part of the reaction product is crystallized. It is dissolved by addition of methanol and heating. The hot solution is filtered from the catalyst and cooled in a refrigerator. Crystals separate and are filtered. The mother liquor is concentrated. On cooling, a second crop is obtained. The crude product melts at 155–159°. Recrystallization from methanol gives the pure ester of M. P. 164–165°.

EXAMPLE 3

5-($\beta$-carbethoxy-$\alpha$-methyl-butyl)-barbituric acid 13 g. of barbituric acid, 16 g. of ethyl ethylacetoacetate, 2 g. of palladium charcoal containing 0.2 g. of palladium, 1 g. ammonium acetate, and 35 cc. of methanol are hydrogenated at 100–110° and 500 lbs. pressure for 16 hours. The mixture is filtered and the filtrate evaporated to dryness. The oily residue is treated with water. It crystallizes soon and is filtered. Recrystallization from about 300 cc. of water gives the pure ester of M. P. 159–161°.

EXAMPLE 4

5-($\beta$-carbethoxy-$\alpha,\beta$-dimethyl-propyl)-barbituric acid 10 g. of barbituric acid, 12 g. of ethyl dimethylacetoacetate, 0.5 g. of palladium charcoal containing 0.05 g. of palladium, 1 g. of ammonium acetate, and 30 cc. of methanol are hydrogenated at 90–100° and 600 lbs. pressure for 22 hours. The reaction mixture is filtered, the filtrate distilled to dryness and the oily residue treated with water. It crystallizes slowly. The crystals are filtered and recrystallized from water and alcohol. The pure compound has M. P. 204–205°.

EXAMPLE 5

5-($\gamma$-carbethoxy-$\alpha$-methyl-n-propyl)-barbituric acid 70 g. of barbituric acid, 84 g. of ethyl levulinate, 5 g. of palladium charcoal containing 0.5 g. of palladium, and 200 cc. of methanol are hydrogenated at 90–100° and 600 lbs. pressure for 20 hours. The solution is filtered. The filtrate is distilled to a small volume and cooled. The crude ester separates slowly. The mother liquor is evaporated nearly to dryness. On standing for several days, it crystallizes to a solid cake. Recrystallization from water gives 46 g. of pure ester. M. P. 102–105°.

EXAMPLE 6

5-($\alpha$-carbethoxy-ethyl)-barbituric acid 13 g. of barbituric acid, 10 g. of ethyl pyruvate, 1 g. of ammonium acetate, 2 g. of palladium charcoal containing 3½% palladium, and 30 cc. of methanol are hydrogenated for 6 hours at 100° and 650 lbs. pressure. The mixture is filtered and the filtrate evaporated to dryness. 23 g. of residue are obtained. Recrystallization from water and alcohol gives the pure compound of M. P. 175°.

EXAMPLE 7

5-(o-carbethoxy-cyclopentyl)-barbituric acid 13 g. of barbituric acid, 16 g. of 2-carbethoxy-cyclopentanon, 1 g. of ammonium acetate, 2 g. of palladium charcoal containing 0.2 g. of palladium, and 35 cc. of methanol are hydrogenated at 100–105° and 600 lbs. pressure for 15 hours. After cooling, most of the product crystallizes.

450 cc. of methanol is added and the mixture refluxed. The hot solution is filtered and cooled. The ester crystallizes slowly. It is filtered. The mother liquor is evaporated to a small volume, yielding a second crop. Recrystallization from methanol gives the pure ester of M. P. 208–210°.

EXAMPLE 8

5-(o-carbethoxy-cyclohexyl)-barbituric acid 13 g. of barbituric acid, 18 g. of 2-carbethoxy-cyclohexanon, 1 g. of palladium charcoal containing 0.1 g. of palladium, and 40 cc. of methanol are hydrogenated at 90° and 600 lbs. pressure for 8 hours. The mixture is filtered and the filtrate evaporated to dryness. The residue is treated with water, filtered and recrystallized from water. The pure ester has M. P. 158–160°.

EXAMPLE 9

5-($\beta$-carboxy-$\alpha$-methyl-ethyl)-barbituric acid 24 g. of the ester formed in Example 2 are dissolved in 100 cc. of 20% sodium hydroxide and warmed to 60° for 30 minutes. After cooling, 50 cc. of concentrated hydrochloric acid are added slowly and the solution cooled in the refrigerator overnight. The acid separates as a fine crystalline powder. It is filtered and recrystallized from water. M. P. 196–197°.

By the general method corresponding to that of Example 9, 5-(o-carboxy-cyclohexyl)-barbituric acid, M. P. 162°, was obtained from 5-(o-carbethoxy-cyclohexyl)-barbituric acid; and 5-($\gamma$-carboxy-$\alpha$-methyl-propyl)-barbituric acid, M. P. 195°, was obtained from 5-($\gamma$-carbethoxy-$\alpha$-methyl-propyl)-barbituric acid.

It will be understood that barbituric acid in all its tautomeric forms will be embraced wherever the term barbituric acid, its pictorial representatives, or its nuclear abbreviation "Barb" is employed throughout the specification and claims.

I claim:

1. Compounds of the group consisting of those corresponding to the general formulae:

$$\begin{array}{c} HN-CO \\ | \quad | \quad alkyl \\ OC \quad CH-HC-(CAB)_n-COOX \\ | \quad | \\ HN-CO \end{array}$$

and $$\begin{array}{c} HN-CO \quad \ulcorner-cycloaliphatic-\urcorner \\ | \quad | \quad | \quad \quad \quad | \\ OC \quad CH-HC \quad \quad \quad |-COOX \\ | \quad | \quad \llcorner_____\lrcorner \\ HN-CO \end{array}$$

in which A, B, and X are members selected from the group consisting of hydrogen and alkyl and in which $n$ is a member of the group consisting of zero and an integer.

2. Compounds corresponding to those of the general formula:

$$\begin{array}{c} HN-CO \\ | \quad | \quad alkyl \\ OC \quad CH-HC-(CAB)_n-COOX \\ | \quad | \\ HN-CO \end{array}$$

in which A, B, and X are members selected from the group consisting of hydrogen and alkyl and in which $n$ is a member of the group consisting of zero and an integer.

3. Compounds corresponding to those of the general formula:

$$\begin{array}{c} HN-CO \quad \ulcorner-cycloaliphatic-\urcorner \\ | \quad | \quad | \quad \quad \quad | \\ OC \quad CH-HC \quad \quad \quad |-COOX \\ | \quad | \quad \llcorner_____\lrcorner \\ HN-CO \end{array}$$

in which X is a member selected from the group consisting of hydrogen and alkyl.

4. Compounds of claim 1 in which X is alkyl.

5. Compounds of claim 2 in which X is alkyl.

6. Compounds of claim 3 in which X is alkyl.

7. 5-($\beta$-carbethoxy-$\alpha$-methyl-ethyl)-barbituric acid.

8. 5-($\gamma$-carbethoxy-$\alpha$-methyl-propyl)-barbituric acid.

9. 5-(o-carbethoxy-cyclohexyl)-barbituric acid.

10. The process of making 5-mono-substituted-barbituric acid, which comprises hydrogenating barbituric acid in the presence of at least one molecular equivalent of a keto-acid ester selected from the group consisting of those corresponding to the general formulae:

$$\begin{array}{c} alkyl \\ | \\ CO-(CAB)_n-COO\ alkyl \end{array}$$

and $$\begin{array}{c} \ulcorner-cycloaliphatic-\urcorner \\ | \quad \quad \quad | \\ OC \quad \quad \quad |-COO\ alkyl \\ | \quad \quad \quad | \\ \llcorner_____\lrcorner \end{array}$$

in which A and B are members selected from the group consisting of hydrogen and alkyl, and $n$ is a member of the group consisting of zero and an integer so as to produce the said 5-mono-substituted barbituric acid.

11. The process of claim 10 in which a keto-acid ester corresponding to the following general formula is employed:

$$\begin{array}{c} alkyl \\ | \\ CO-(CAB)_n-COO\ alkyl \end{array}$$

in which A and B are members selected from the group consisting of hydrogen and alkyl, and $n$ is a member of the group consisting of zero and an integer.

12. The process of claim 10 in which a keto-acid ester corresponding to the following formula is employed:

$$\begin{array}{c} \ulcorner-cycloaliphatic-\urcorner \\ | \quad \quad \quad | \\ OC \quad \quad \quad |-COO\ alkyl \\ | \quad \quad \quad | \\ \llcorner_____\lrcorner \end{array}$$

13. The process of claim 10 in which the keto-acid ester is ethyl acetoacetate.

14. The process of claim 10 in which the keto-acid ester is ethyl levulinate.

15. The process of claim 10 in which the keto-acid ester is 2-carbethoxy-cyclohexanon.

16. The process of claim 10 in which the hydrogenation is carried out in the presence of a catalyst.

17. The process of claim 10 in which the hydrogenation is carried out in the presence of a noble-metal catalyst.

18. The process of claim 10 in which the hydrogenation is carried out in the presence of palladium charcoal.

WILHELM WENNER.

REFERENCES CITED

The following references are record in the file of this patent:

American Chemical Journal, vol. 49, pp. 190 and 192.

Leibigs Annalen 335, pp. 334–367 (1904).